US011907792B2

United States Patent
Giovannini et al.

(10) Patent No.: US 11,907,792 B2
(45) Date of Patent: Feb. 20, 2024

(54) CLOSURE ELEMENT HAVING A TRANSPONDER BETWEEN AN INNER CAP MEMBER AND AN OUTER CAP MEMBER

(71) Applicant: Guala Closures S.p.A., Spinetta-Marengo (IT)

(72) Inventors: Marco Giovannini, Luxembourg (LU); Davide Capra, Leudelange (LU); Luca Viale, Alessandria (IT); James Andrew Oldfield, Burntisland Fife (GB)

(73) Assignee: GUALA CLOSURES S.P.A., Spinetta Marengo (IT)

( * ) Notice: Subject to any disclaimer, the term of this patent is extended or adjusted under 35 U.S.C. 154(b) by 0 days.

(21) Appl. No.: 17/913,120

(22) PCT Filed: Mar. 20, 2020

(86) PCT No.: PCT/EP2020/057831
§ 371 (c)(1),
(2) Date: Sep. 20, 2022

(87) PCT Pub. No.: WO2021/185457
PCT Pub. Date: Sep. 23, 2021

(65) Prior Publication Data
US 2023/0130229 A1    Apr. 27, 2023

(51) Int. Cl.
*G06K 19/077* (2006.01)
*G06K 19/04* (2006.01)

(52) U.S. Cl.
CPC ..... *G06K 19/07798* (2013.01); *G06K 19/041* (2013.01)

(58) Field of Classification Search
None
See application file for complete search history.

(56) References Cited

U.S. PATENT DOCUMENTS

2008/0149584 A1 *  6/2008  Martinelli .............. G06Q 10/08
                                             215/202
2008/0238675 A1 * 10/2008  Yang ................... B65D 55/028
                                             340/572.1
(Continued)

FOREIGN PATENT DOCUMENTS

CN    106628581 A    5/2017
EP      2865607 A1   4/2015
(Continued)

OTHER PUBLICATIONS

Foreign Communication from a Related Counterpart Application, International Search Report and Written Opinion dated Sep. 9, 2020, International Application No. PCT/EP2020/057831 filed on Mar. 20, 2020.

(Continued)

*Primary Examiner* — Suezu Ellis

(57) ABSTRACT

A closure element for closing a container, comprises an inner cap member to be coupled with a mouth of the container; an outer cap member rotatably coupled to the inner cap member, and a transponder housed between the inner cap member and the outer cap member. the transponder comprises a chip, an antenna, and a control loop. The chip is attached to one of a top wall of the inner cap member and a top wall of the outer cap member and at least a portion of the control loop is attached to the other of a top wall of the inner cap member and a top wall of the outer cap member, in such a way that a relative rotation of outer cap member and the inner cap member determines a torsion or shear force to act on the control loop to break it.

14 Claims, 7 Drawing Sheets

(56) References Cited

U.S. PATENT DOCUMENTS

2015/0186770 A1*  7/2015  Arai .................. B65D 41/3447
                                                            235/492
2017/0297790 A1    10/2017 Porte et al.

FOREIGN PATENT DOCUMENTS

| | | |
|---|---|---|
| JP | 2009001326 A | 1/2009 |
| KR | 100967340 B1 | 7/2010 |
| RU | 2622806 C2 | 6/2017 |
| RU | 2696894 C1 | 8/2019 |
| RU | 2706247 C2 | 11/2019 |
| WO | 2005024745 A2 | 3/2005 |
| WO | 2021185457 A1 | 9/2021 |

OTHER PUBLICATIONS

Foreign Communication from a Related Counterpart Application, Russian Office Action and Search Report dated Jul. 11, 2023, Russian Application No. 2022127074/28(059197) filed Mar. 20, 2020.

Foreign Communication from a Related Counterpart Application, Russian Office Action and Search Report dated Jul. 13, 2023, Russian Application No. 2022127076/03(059201) filed Mar. 20, 2020.

* cited by examiner

CLOSURE ELEMENT HAVING A TRANSPONDER BETWEEN AN INNER CAP MEMBER AND AN OUTER CAP MEMBER

CROSS-REFERENCE TO RELATED APPLICATIONS

The present application is a filing under 35 U.S.C. 371 as the National Stage of International Application No. PCT/EP2020/057831, filed Mar. 20, 2020, entitled "CLOSURE ELEMENT," which is incorporated herein by reference in its entirety for all purposes.

TECHNICAL FIELD

The present invention refers to a closure element for closing a container like a bottle, canister, or the like.

BACKGROUND

In the context of bottling of high quality and valued beverages, closure elements having anti-tampering means are used. In particular, a known closure element comprises a transponder, such as an RFID tag (sometimes also called IC tag), which is modified in its structure when opened.

An RFID tag generally comprises a chip and an antenna, as well as sometimes a piece of control loop separately connected to the chip. When opening the closure member, either the antenna can be interrupted so that the chip cannot be read out any more, or the piece of loop can be interrupted to thus change the state of the chip. In particular, the interruption of the antenna or loop is effected by rotating the closure member with the tag with respect to the neck of the bottle/neck label).

If, in the unopened state, the chip is interrogated by bringing a reading device (for example in a mobile phone) close to the antenna, the transponder in the RFID tag communicates its unopened state. If the transponder is interrogated after the piece of loop has been interrupted upon opening the closure, it communicates that the closure member has been opened. If the antenna has been interrupted, readout is no longer possible, and the user should be wary.

According to the state of the art, the antenna or the control loop is interrupted by using a cutting means or the like.

Therefore, if the RFID tag or a part thereof is damaged, readout is affected, and the consumer can recognize that the closure member has been removed or that an attempt to manipulate the closure member should be considered.

In the industry, it is particularly desired to provide high-value beverages such as wine and spirits with closures like the above. However, closure members like the above are complicated in manufacturing and in assembling onto the bottle or container.

Indeed, the antenna or the control loop to be interrupted is to be arranged between the closure element and the bottle neck such that the opening of the closure element determines the interruption.

In other cases, the closure element comprises two portions rotatably coupled and the RFID tag is placed between the portions, such as an inner cap fitted onto a container mouth, an outer cap fitted onto the inner cap and an IC tag therebetween. The IC tag may comprise a resin film that includes an IC chip, an antenna and an unsealing detector circuit. Either the outer cap or the inner cap may comprise one or more cutters for interrupting the unsealing detector circuit. Upon opening, the inner and outer caps are rotated with respect to each other so that the antenna or the unsealing detector circuit is interrupted by means of cutters. The unsealing detector circuit may either be arranged between the top walls or the side walls of the inner and outer cap, respectively. In either case, the disadvantage is that the placement of the unsealing detector circuit and the cutter(s) needs to be very precise to guarantee fault-free operation so that the configuration of the closure element is rather complex and expensive.

Indeed, in the first case, the cutters are essential to obtain the interruption of the relevant circuit parts of the RFID tag and, to that end, the cutters have to be correctly aligned with them. As for the second case, the correct positioning of the unsealing detector circuit between the lateral walls of the inner and outer caps is extremely complicated and needs particular care when assembling the closure element.

In addition, it is to be noted that an RFID chip can also store additional information about the container's contents or the container history, such as best before dates, information related to brand, product history, product information, tax information etc., which may be of interest to the user even after the bottle has been opened. Such additional information can be read out by a receiver. However, in a case where the antenna or the entire chip are damaged or broken, such additional information cannot be read anymore by the receiver.

SUMMARY OF THE INVENTION

It is, therefore, an object of the invention to provide a closure element which is easy to be manufactured and assembled.

The subject-matter of claim 1 provides a closure element with features for addressing this object. Further preferred embodiments are mentioned in the dependent claims and/or outlined in the following description.

According to the invention, the chip of the transponder is attached to the top wall of the inner cap member or the top wall of the outer cap member and at least a portion of the control loop is attached to the other of the top wall of the outer cap member and the top wall of the inner cap member, respectively. In such a way, a relative rotation of the outer cap member and the inner cap member determines a torsion or shear force to act on the control loop to break it.

An advantage of the closure element of the invention is that the transponder can be easily and quickly arranged between the top walls of the outer cap member and those of the inner cap member. The top walls face each other in a substantially parallel configuration. Therefore, it is possible to take advantage of the relative rotation of the walls to determine a torsion which breaks the portion of the control loop.

Another advantage of the closure element of the invention is that the break of the control loop is performed only by means of said torsion and it does not need any further specific means, such as a cutter or the like which would need to be aligned. Therefore, the design of the outer cap member and/or that of the inner cap member can be simplified.

In addition, it is to be noted that, in an opened configuration, both the chip and the antenna of the transponder are operative. Therefore, the closure element according to the present invention can provide the additional information contained in the RFID chip even when the closure element is opened.

Advantageously, the closure element according to another aspect of the invention further comprises a substrate on which the transponder is housed. In this case, the substrate comprises a first portion, housing the RFID chip and the antenna, and a second portion, housing said portion of the control loop. The first portion is folded onto the second portion. This solution allows preparing the chip, the antenna and the control loop of the transponder in advance in a folded configuration and arranging it between the top walls of the inner and outer cap members. Therefore, the assembly of the closure element is simplified and speeded.

Advantageously, in the closure element according to another aspect of the invention, the first portion of the substrate is attached to one of the top wall of the inner cap member and the top wall of the outer cap member and the second portion of the substrate is attached to the other of the top wall of the inner cap member and the top wall of the outer cap member. Due to this feature, the connection of the portions of the substrate with the top walls of the outer and inner cap member is simplified.

Advantageously, in the closure element according to another aspect of the invention, the first portion of the substrate is attached to the top wall of the outer cap member and the second portion of the substrate is attached to the top wall of the inner cap member. This configuration allows increasing the effectiveness of the torsion determined by the rotation of the outer cap member with reference to the inner cap member. Therefore, the reliability of the closure element of the present invention is increased.

Advantageously, the closure element according to another aspect of the invention comprises anti-rotation means arranged between the substrate and the top wall of the outer cap member and the top wall of the inner cap member. This allows preventing unwanted slipping of the substrate housing the transponder with reference to the outer and/or inner cap member. In particular, the anti-rotation means allows the relative rotation of the first and second portions of the substrate to efficiently determine the break of the control loop portion. Therefore, the reliability of the closure element of the present invention is increased.

Advantageously, in the closure element according to another aspect of the invention, the anti-rotation means comprises ribs protruding from the first portion and/or second portion of the substrate and housed in corresponding recesses on the top wall of the outer cap member and/or on the top wall of the inner cap member, respectively. Since the anti-rotation means comprises ribs to be coupled with corresponding recesses, the mechanical coupling between the portions of the substrate and the top walls of the outer and inner cap member is performed in an effective and easy way.

Advantageously, in the closure element according to another aspect of the invention, the anti-rotation means comprises a plurality of first ribs protruding from the first portion of the substrate and housed in corresponding first recesses in the outer cap member and a plurality of second ribs protruding from the second portion of the substrate and housed in corresponding second recesses in the inner cap member. This allows an efficient transmission of the movement between the first portion of the substrate and the outer cap member, and also between the second portion of the substrate and the inner cap member. Therefore, the relative rotation between the top walls is efficiently transmitted to both respective portions of the substrate to promote a corresponding relative rotation thereof.

Advantageously, in the closure element according to another aspect of the invention, the first ribs and the second ribs are straight ribs radially disposed around a centre of the first portion and second portion of the substrate. This technical feature allows an efficient transmission of the torsion from the top walls of the outer and inner cap members to the portions of the substrate and the manufacturing of the anti-rotation means is maintained simple and quick.

Advantageously, in the closure element according to another aspect of the invention, the anti-rotation means comprises centring features projecting from the top wall of the outer cap member and the top wall of the inner cap member, respectively; wherein the first portion and the second portion of the substrate present corresponding holes counter-shaped with reference to the centring features; the holes being shaped such that they comprise at least a non-circular portion. This solution provides an alternative way to impede the relative rotation between each top wall and the corresponding portion of the substrate. In addition, this allows a good centring of the support with reference to the outer and inner cap members.

Advantageously, the closure element according to another aspect of the invention further comprises a coupling means between the first portion and the second portion of the substrate to maintain the relative position of the first portion and the second portion in a folded configuration. This configuration allows an easy and quick connection of the portions of the substrate. In addition, the coupling means allows the portions of the substrate to easily and stably maintain their reciprocal position when folded so that assembly of the substrate with the outer and inner cap member is simplified.

Advantageously, in the closure element, according to this aspect of the invention, the coupling means comprises a first hole provided on the first portion of the substrate, a second hole provided on the second portion of the substrate and a collar protruding from the second hole, the collar being fitted around the first hole in the first portion of the substrate in the folded configuration. This configuration provides an easy solution to stably maintain the relative position of the portions of the substrate. In addition, it allows coupling the first and second portions of the substrate while folding them onto one another.

Advantageously, in the closure element according to another aspect of the invention the inner cap member presents a groove arranged between the top wall and the side wall of the inner cap member, the groove facing the outer cap member; the outer cap member comprising a tooth arranged between the top wall and the side wall of the outer cap member; the tooth being slidingly housed in the groove; wherein the groove extends only in part along the circumferential extension of the inner cap member. This allows the outer cap member to rotate around the inner cap member to determine a relative rotation of the portions of the substrate in such a way to obtain the torsion necessary to break the portion of the control loop. In addition, when the tooth reaches the end of the groove, the rotation of the outer cap member determines the rotation of the inner cap member in order to unscrew the closure element.

BRIEF DESCRIPTION OF THE DRAWINGS

The invention may be better understood with reference to the following specification disclosed in a preferred embodiment thereof and taken in conjunction with the following accompanying drawings in which.

The description and the accompanying drawings are to be construed by ways of example and not of limitation.

DETAILED DESCRIPTION OF PREFERRED EMBODIMENTS

Embodiments of the invention will be described in further detail in the following. Modifications of certain individual features in this context can be combined with other features, thereby providing additional embodiments.

Figure 1:
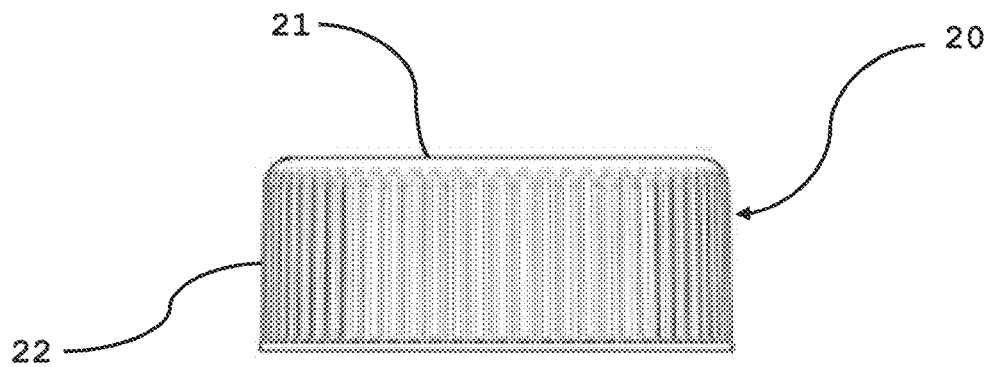
FIG. 1 is an exploded, lateral view of an embodiment of the closure element of the present invention.
Figure 1:
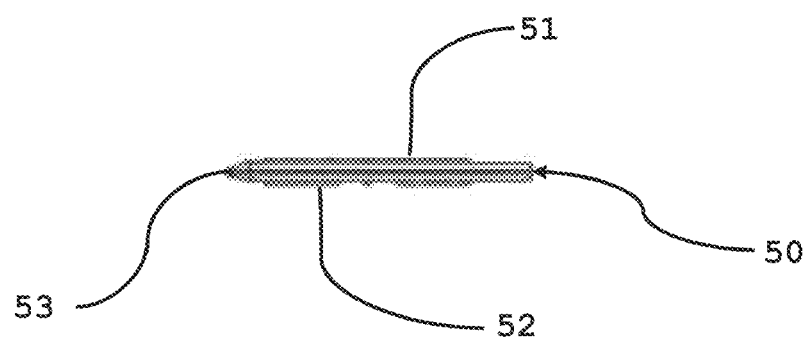
Figure 1:
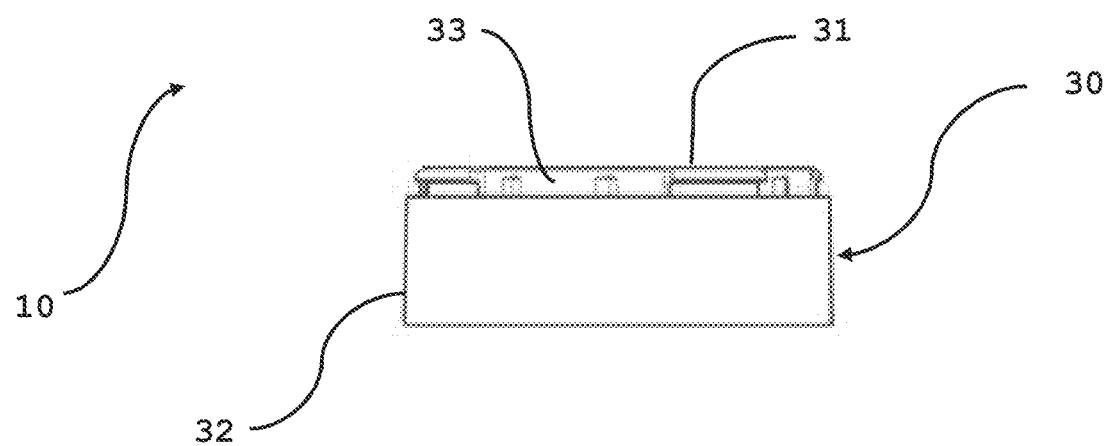
Figure 2:
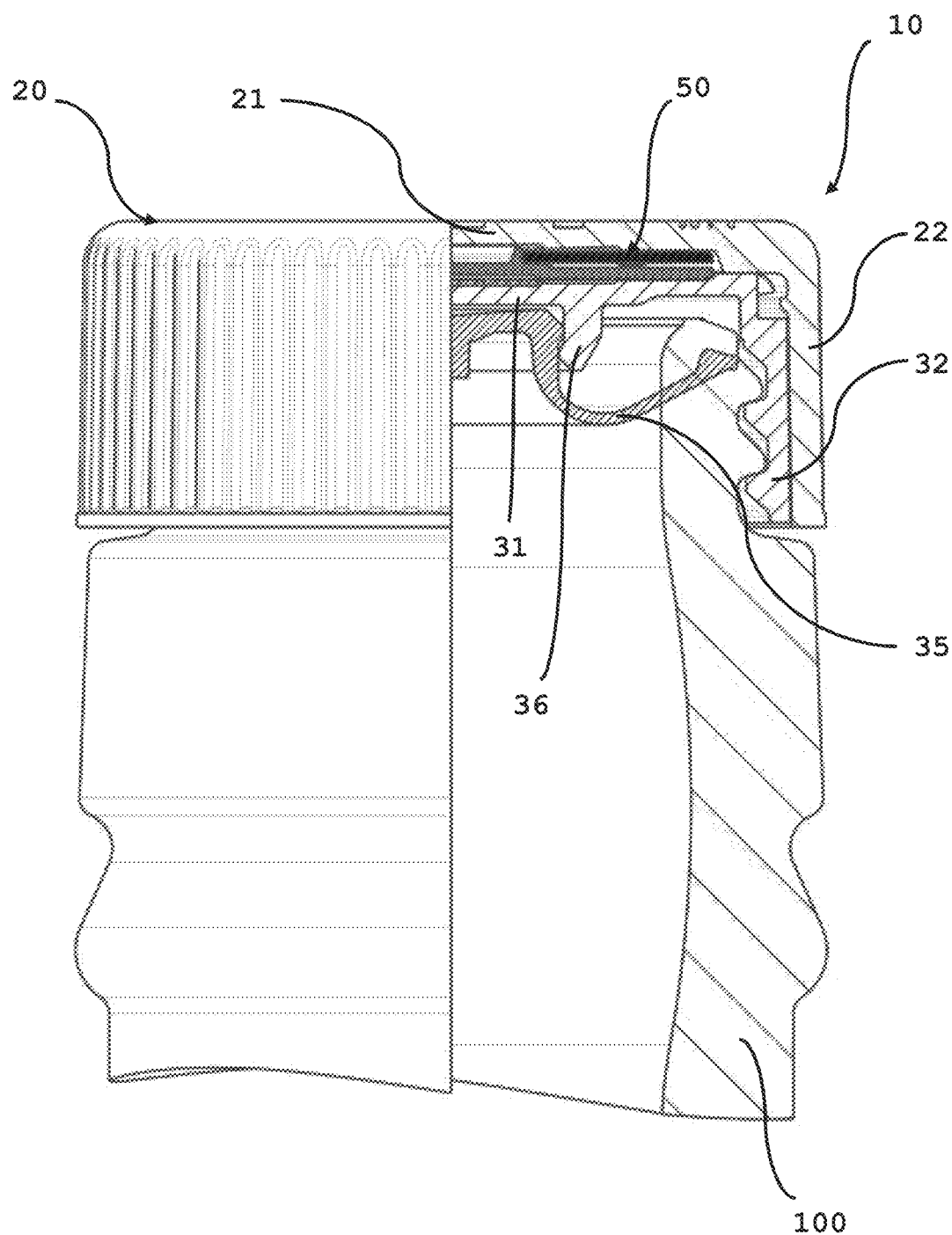
FIG. 2 is a cross-sectional view of the embodiment shown in FIG. 1.
Figure 3:
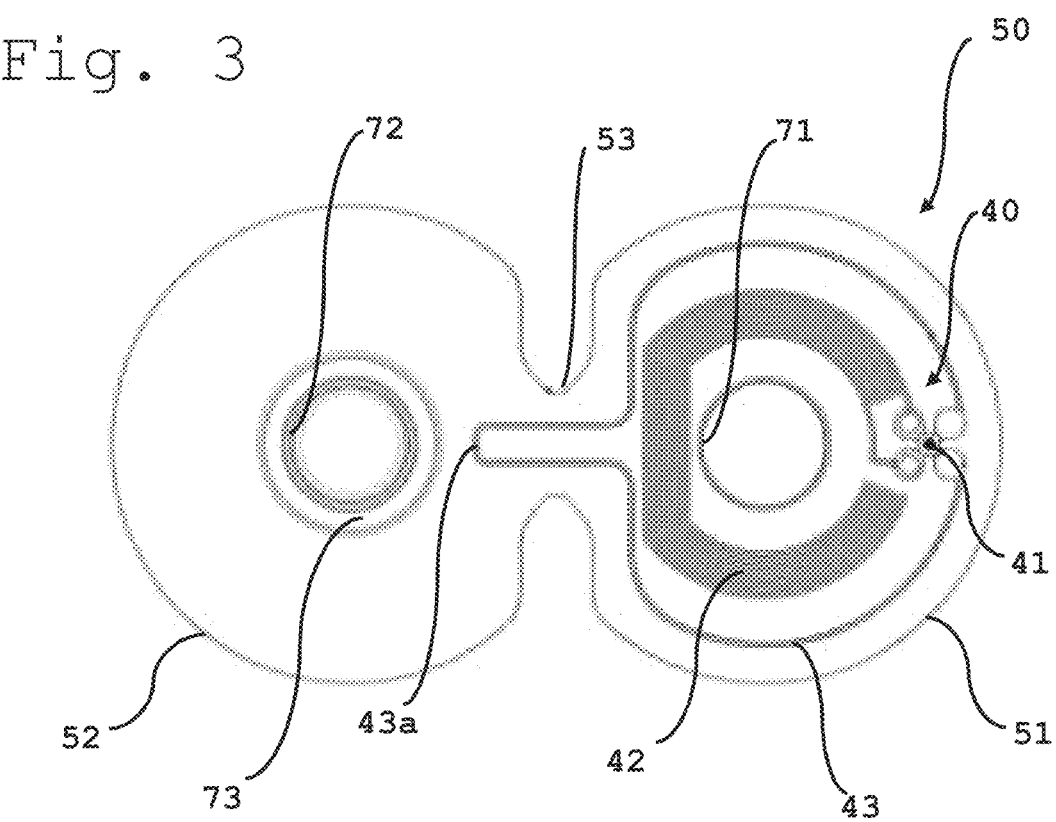
FIG. 3 is a plan view of one side of a part of the closure element of FIG. 1 in an unfolded configuration.
Figure 4:
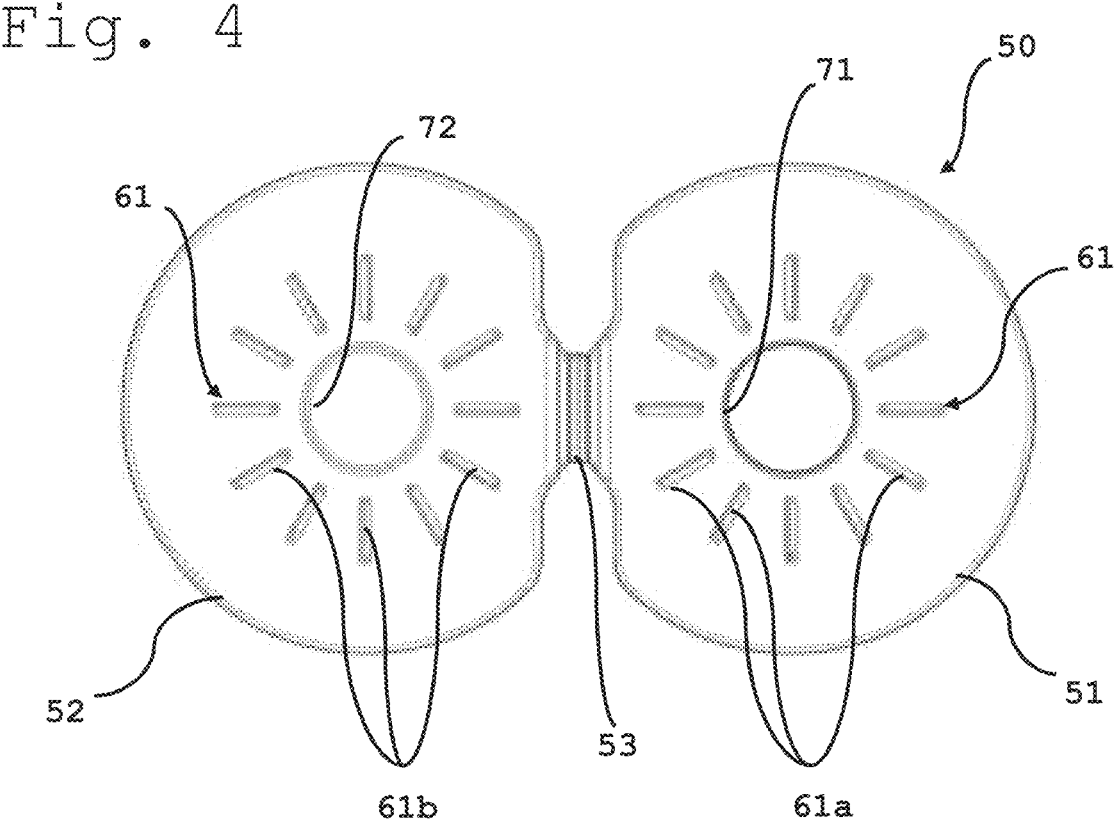
FIG. 4 is a plan view of the other side of the part of FIG. 3.

FIG. 1 shows a closure element 10 comprising an outer cap member 20 and an inner cap member 30 coupled with the outer cap member 20. The inner cap member 30 is to be coupled with a mouth of a container 100 in a rotatably fixed manner. In this regard, the inner cup portion 30 comprises a screw portion 34 for coupling with the mouth of the container 100.

The outer cap member 20 comprises a top wall 21, preferably of circular shape, and a side wall 22, preferably of cylindrical shape, extending from an edge of the top wall 21.

The inner cap member 30 comprises a top wall 31, preferably of circular shape, and a side wall 32, preferably of cylindrical shape, extending from an edge of the top wall 31.

The screw portion 34 is realised on the inside of the side wall 32 of the inner cap member 30.

The outer cap member 20 is rotatably coupled to the inner cap member 30 in such a way that the outer cap member 20 can rotate with reference to the inner cap member 30 for a first part of its movement and then, after the outer cap member 20 engages the inner cap member 30, both the outer cap member 20 and the inner cap member 30 rotate together in a second part of the movement to unscrew the closure element 10.

Figure 7A:
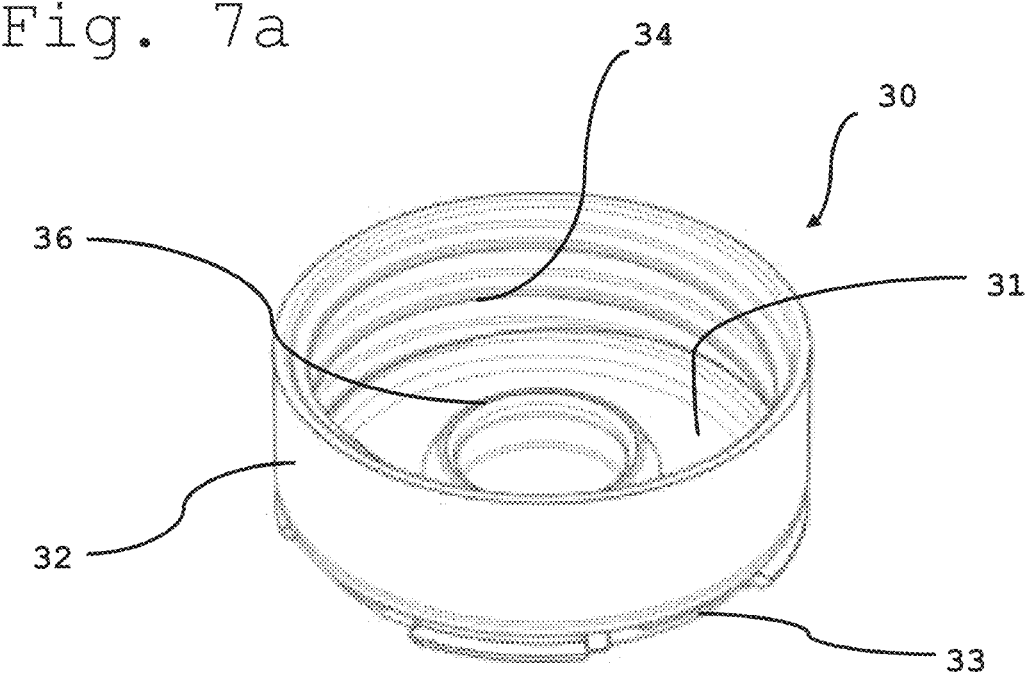
FIGS. 7a and 7b are perspective views of further details of the closure element of the invention.
Figure 7B:
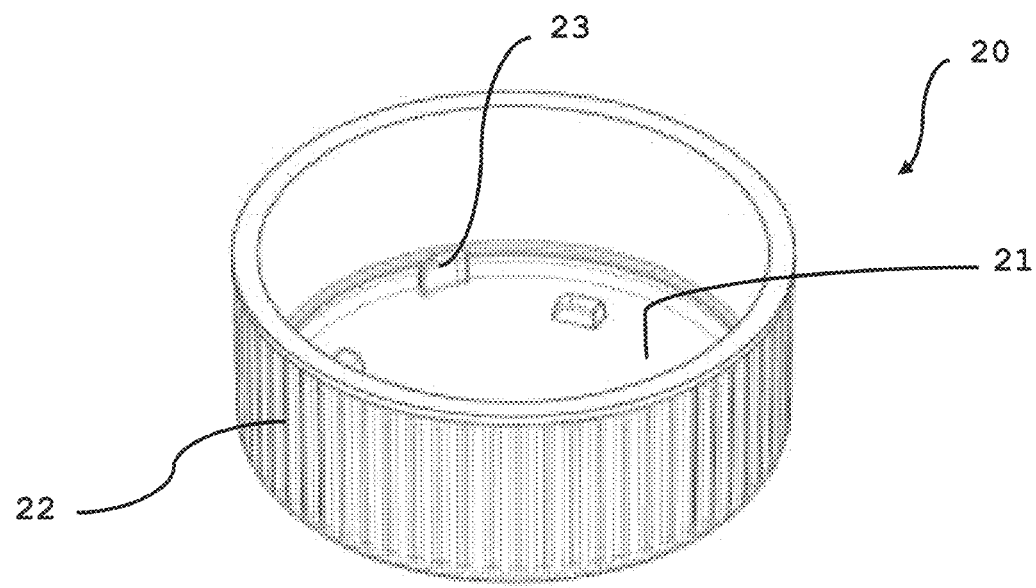

In this regard, with reference to FIGS. 7a and 7b, the inner cap member 30 presents at least a groove 33 arranged between the top wall 31 and the side wall 32 thereof. The groove 33 extends only in part along the circumferential extension of the inner cap member 30. Preferably, the inner cap member 30 presents a plurality of grooves 33, each having the same length. They may also be evenly angularly spaced, i.e. arranged in equal intervals around the circumference of the inner cap member 30.

The grooves 33 face the outer cap member 20. In the embodiment of FIGS. 7a and 7b, the grooves 33 face a junction zone between the top wall 21 and the side wall 22 of the outer cap member 20.

The outer cap member 20 comprises at least a tooth 23 arranged between the top wall 21 and the side wall 22 thereof. Preferably, the outer cap member 20 comprises a plurality of teeth 23 which are evenly angularly spaced.

Each tooth 23 is housed in a corresponding groove 33 in such a way that it can slide along the groove 33. When the teeth 23 reach the ends of the respective grooves 33, the outer cap member 20 engages the inner cap member 30 and the outer cap member 20 transmits the rotation movement to the inner cap member 30 to unscrew the closure element 10 and open the container 100.

As already stated, the torsion or shear force breaking the portion 43a of the control loop 43 is carried out during the relative rotation of the outer cap member 20 with respect to the inner cap member 30. In other words, during a first step the portion 43a of the control loop 43 is broken and, during a second step following the first one, the outer cap member 20 engages the inner cap member 30 to open the closure element 10.

According to the invention, the closure element 10 further comprises a transponder 40 housed between the inner cap member 30 and the outer cap member 20. In detail, the transponder 40 is arranged between the top wall 21 of the outer cap member 20 and the top wall 31 of the inner cap member 30.

The transponder 40 can be active or passive. According to the preferred embodiment, the transponder is of the passive type. Preferably, the transponder 40 is an RFID tag. More preferably, the transponder 40 is an NFC ("near field communication") tag. An NFC tag is based on high frequency (HF)-RFID technology but operates only on very short ranges (of the order of a few centimetres).

The transponder 40 comprises a chip 41 and an antenna 42. In addition, the transponder 40 also comprises a control loop 43 connected with the chip 41.

According to the invention, the chip 41 of the transponder is attached to one of the top wall 31 of the inner cap member 30 and the top wall 21 of the outer cap member 20 and at least a portion 43a of the control loop 43 is attached to the other of the top wall 31 of the inner cap member 30 and the top wall 21 of the outer cap member 20.

In this way, a relative rotation of the outer cap member 20 and the inner cap member 30 determines a torsion or shear force to act on the control loop 43 to break it. With more detail, the cited relative rotation determines the separation of the portion 43a of the control loop 43 from the rest of the control loop 43.

The separation of the portion 43a of the control loop 43 from the rest of the control loop 43 causes a modification in the information readable in the transponder 40 through a reader. Therefore, once the portion 43a of the control loop 43 is separated from the rest of the control loop 43, an open status of the closure element 10 of the present invention can be detected.

According to a preferred embodiment, the closure element 10 comprises a substrate 50 on which the transponder 40 is housed.

The substrate 50 is of flat shape. The substrate 50 comprises a first portion 51 and a second portion 52 connected to the first portion 51. In addition, the substrate 50 comprises a hinge portion 53 to connect the first portion 51 and the second portion 52.

The first portion 51 houses the chip 41 and the antenna 42 of the RFID. In addition, the first portion 51 houses a part of the control loop 43. More in detail, the first portion 51 houses only part of the control loop 43.

The second portion 52 houses the portion 43a of the control loop 43 to be separated. In detail, the second portion 52 houses only the portion 43a of the control loop 43 to be separated.

The first portion 51 is folded onto the second portion 52 in such a way that, in the folded configuration, the first portion 51 overlaps, preferably completely overlaps the second portion 52. The first portion 51 is folded onto the second portion 52 around the hinge portion 53. Therefore, the hinge portion 53 defines a fold line.

As a consequence, the portion 43a of the control loop 43 to be separated is folded to overlap the rest of the control loop 43.

The substrate 43 can be made of any suitable material able to be easily folded. For example, the substrate can be made of paper or plastic film.

The first portion 51 of the substrate 50 is attached to one of the top wall 31 of the inner cap member 30 and the top wall 21 of the outer cap member 20. The second portion 52 of the substrate 50 is attached to the other of the top wall 31 of the inner cap member 30 and the top wall 21 of the outer cap member 21.

In this way, a relative rotation of the outer cap member 20 with reference to the inner cap member 30 determines a corresponding relative rotation between the first portion 51 and the second portion 52 of the substrate 50. As a consequence, a torsion or shear force occurs between the portion 43a of the control loop 43 and the rest of the control loop 43 which causes the breakage and separation of the portion 43a from the rest of the control loop 43. The control loop 43 is thus interrupted and this alters the state of the RFID chip 41 to which it is connected.

The control loop 43 passes across the hinge portion 53. Preferably, the hinge portion 53 defines a weakened portion in which the breakage of the substrate 50 is facilitated when the substrate 50 is exposed to torsion or shear force. The weakened portion of the substrate 50 can be defined by one or more of a tear line, a reduced thickness portion and a reduced width portion (such as one or more indentations).

The substrate 50 can be of any shape. Preferably, the substrate 50 in the folded configuration is counter-shaped with reference to the shape of the top wall 21 of the outer cap member 20 and of the top wall 31 of the inner cap member 30.

In the described embodiment, the substrate 50 in the folded configuration is substantially of round shape. More in detail, the substrate 50 in the folded configuration, in a plan view, presents a circular-shaped portion and a straight-shaped portion at the hinge portion 53.

The first portion 51 and the second portion 52 have the same shape. The hinge portion 53 is placed at a medium point at the straight-shaped portions.

With reference to the preferred embodiment, the first portion 51 of the substrate 50 is attached to the top wall 21 of the outer cap member 20 and the second portion 52 of the substrate 50 is attached to the top wall 31 of the inner cap member 31.

For example, each of the first portion 51 and the second portion 52 is attached to the corresponding top walls 21, 31 of the outer cap member 20 and inner cap member 30, respectively, by means of adhesive layers.

With reference to a preferred embodiment, the closure element 10 further comprises anti-rotation means arranged between the substrate 50 and the top wall 21 of the outer cap member 20 and the top wall 31 of the inner cap member 30.

The anti-rotation means allows the relative rotation between the top walls 21, 31 of the outer cap member 20 and inner cap member 30 to be reliably transmitted to the first portion 51 and the second portion 52 of the substrate 50 so that they are also rotated with respect to one another.

In detail, the anti-rotation means comprises ribs 61, 61a, 61b protruding from the first portion 51 and/or the second portion 52 of the substrate 50 and is housed in corresponding recesses (not shown) on the top wall 21 of the outer cap member 20 and/or on the top wall 31 of the inner cap member 30, respectively.

When the ribs 61, 61a, 61b are arranged within the corresponding recesses, a relative rotation between the top walls 21, 31 of the outer and inner cap members 20, 30 and the first and second portions 51, 52 of the substrate 50 is impeded.

Therefore, the relative rotation of the top walls 21, 31 of the outer and inner cap members 20, 30 is transmitted to the first and second portions 51, 52 of the substrate 50.

In the preferred embodiment, the anti-rotation means comprises a plurality of first ribs 61a protruding from the first portion 51 of the substrate 50 and housed in corresponding first recesses (not shown) in the top wall 21 of the outer cap member 20. In addition, the anti-rotation means 60 comprises a plurality of second ribs 61b protruding from the second portion 52 of the substrate 50 and housed in corresponding second recesses (not shown) in the top wall 31 of the inner cap member 30.

Preferably, the first ribs 61a and the second ribs 61b are straight ribs radially disposed around a centre of the first portion 51 and second portion 52 of the substrate 50. This provides a uniform transfer of the torque from the top walls 21, 31 to the first and second portions 51, 52.

In addition, the first ribs 61a and the second ribs 61b are disposed evenly angularly spaced from each other.

The ribs 61, 61a, 61b project from respective surfaces of the first and second portions 51, 52 which are opposite to corresponding surfaces housing the chip 41, the antenna 42 and the control loop 43 of the RFID chip 40.

The closure element 10 further comprises coupling means 70 between the first portion 51 and the second portion 52 of the substrate 50 to maintain the relative position of the first portion 51 and the second portion 52 in a folded configuration.

Figure 6:
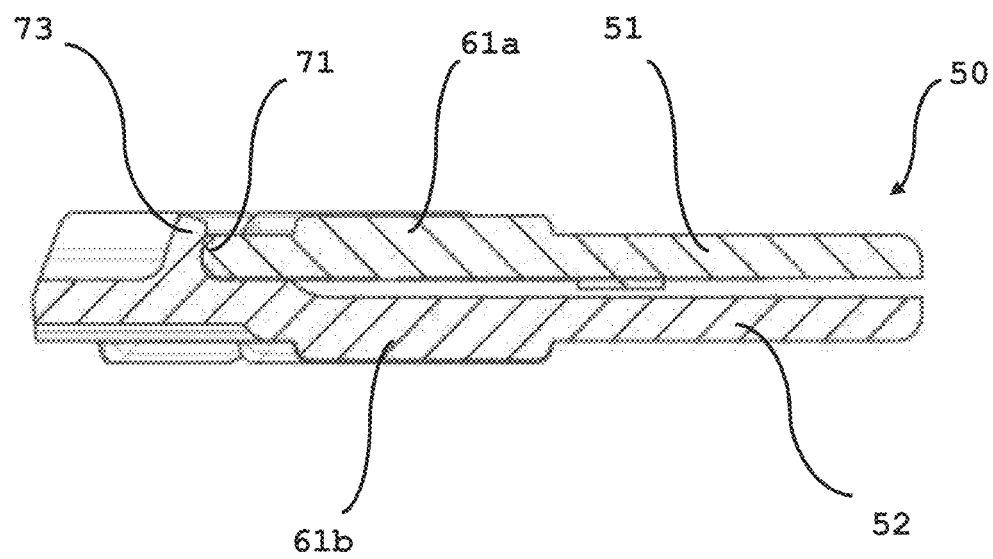
FIG. 6 is a partial sectional view of the part of FIG. 3 in the folded configuration.

In detail, with reference to FIG. 6, the coupling means 70 comprises a first hole 71 provided on the first portion 51 of the substrate 50, a second hole 72 provided on the second portion 52 of the substrate 50 and a collar 73 protruding from the second hole 72. When the support 50 is folded in the folded configuration, the collar 73 is fitted around the first hole 71 and the first portion 51 and the second portion 52 of the substrate 50 are stably coupled together.

The collar 73 is counter-shaped with reference to the second hole 72 in order to be fitted thereon.

According to the described embodiment, the first hole 71, the second hole 72 and the collar 73 are circular-shaped in a plan view. In addition, in the folded configuration, the first hole 71, the second hole 72 and the collar 73 are coaxially arranged with reference to a centre of the substrate 50.

Figure 5:
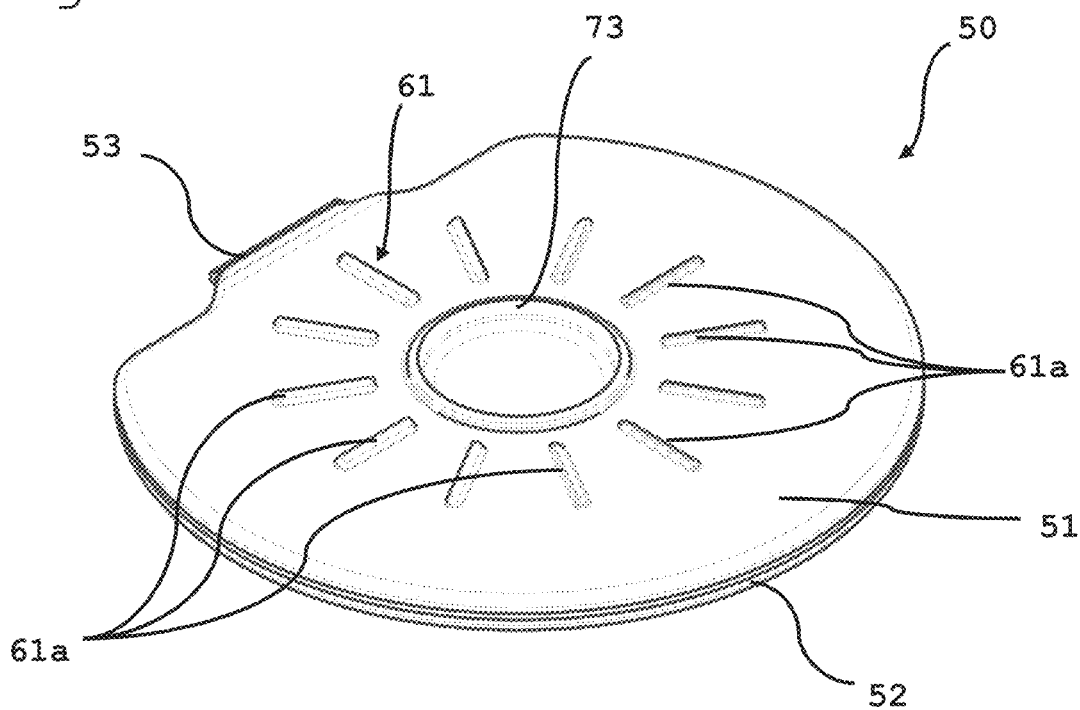
FIG. 5 is a perspective view of the part of FIG. 3 in a folded configuration.

With particular reference to FIG. 5, the collar 73 presents a frusto-conical shape. In other words, the collar 73 protrudes from the second hole 72 edge moving away from the centre of substrate 50. In this way, in a region immediately external to the collar 73, a seat for housing the edge of the first hole 71 is defined, when the collar 73 is inserted into the first hole 71.

The closure element 10 comprises a cap liner 35 which is coupled to the inner cap member 30 to provide a seal between the closure element 10 and the container 100 mouth.

In detail, the cap liner 35 is coupled to the inner cap member 30 by means of a coupling protrusion 36 protruding from a surface of the top wall 31 opposite to a surface connected with the substrate 50.

Figure 8A:
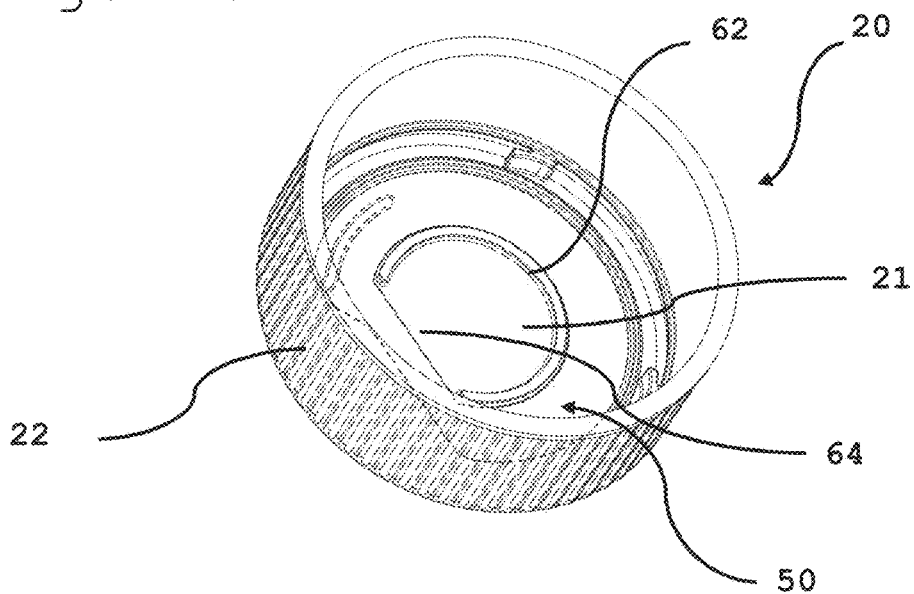
FIGS. 8a and 8b and 8c are perspective views of parts of the closure element according to an alternative embodiment of the invention.
Figure 8B:
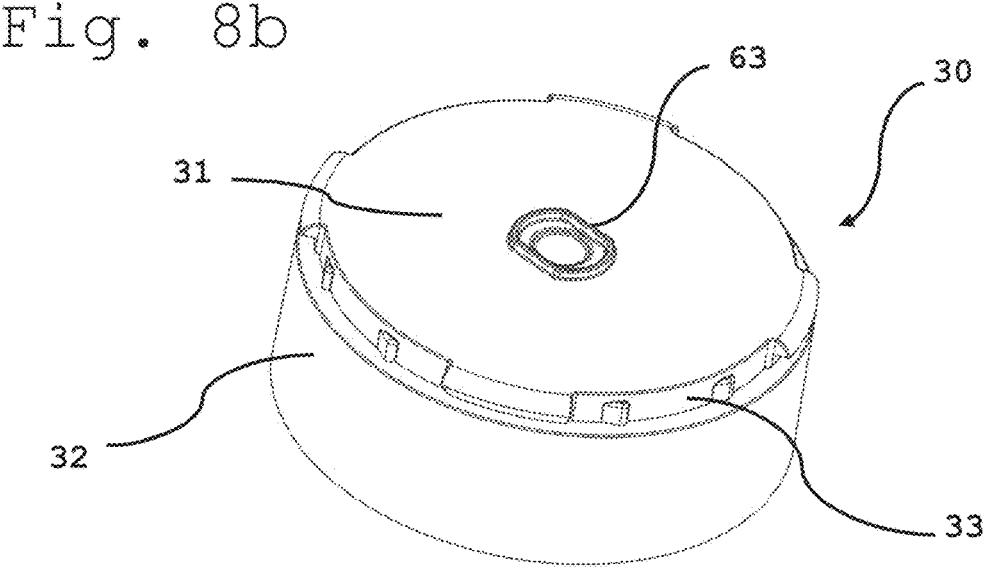

According to an alternative embodiment (see FIGS. 8a to 8c), the anti-rotation means 60 comprises a centring feature 62 projecting from the top wall 21 of the outer cap member 20. In addition, the anti-rotation means 60 comprises a further centring feature 63 projecting from the top wall 31 of the outer cap member 30.

The first portion 51 of the substrate 50 presents a corresponding centring hole 64 counter-shaped with reference to the centring feature 62.

In the same way, the second portion 52 of the substrate 50 presents a corresponding further centring hole 65 counter-shaped with reference to the further centring feature 63.

The substrate 50 is coupled to the outer cap member 20 in such a way that the centring feature 62 fits into the centring hole 64. Analogously, the substrate 50 is coupled to the inner cap member 30 in such a way that the further centring feature 63 fits into in the centring hole 65.

The centring hole 64 and the further centring hole 65 are shaped such that they comprise at least a non-circular portion. This prevents undesired rotations of the first and second portions 51, 52 with respect to the corresponding top walls 21, 31.

Figure 8C:
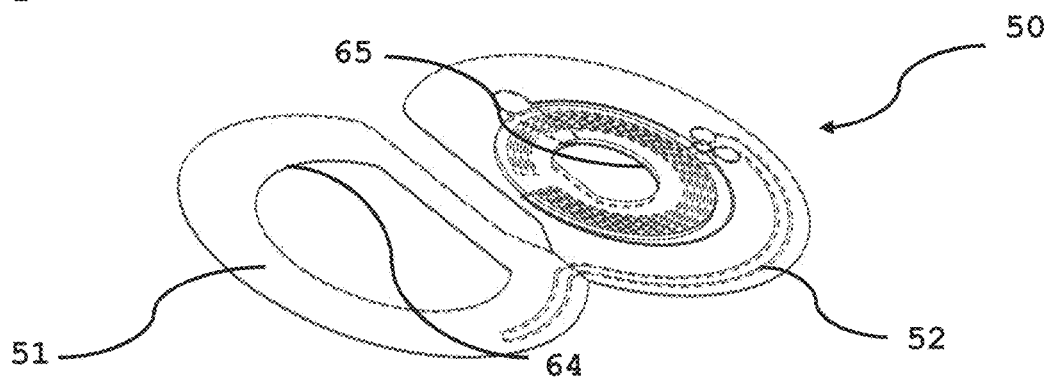

As can be seen in FIG. 8c, the centring hole 64 is shaped such that it comprises a circular portion and a straight portion.

The further centring hole 65 is shaped such that it comprises two semi-circular portions and two straight portions alternately disposed.

The centring feature 62 develops along a partially circular, open path. The further centring feature 63 develops along a closed path having two semi-circular portions and two straight portions parallel to each other and connected to the semi-circular portions.

Figure 9:
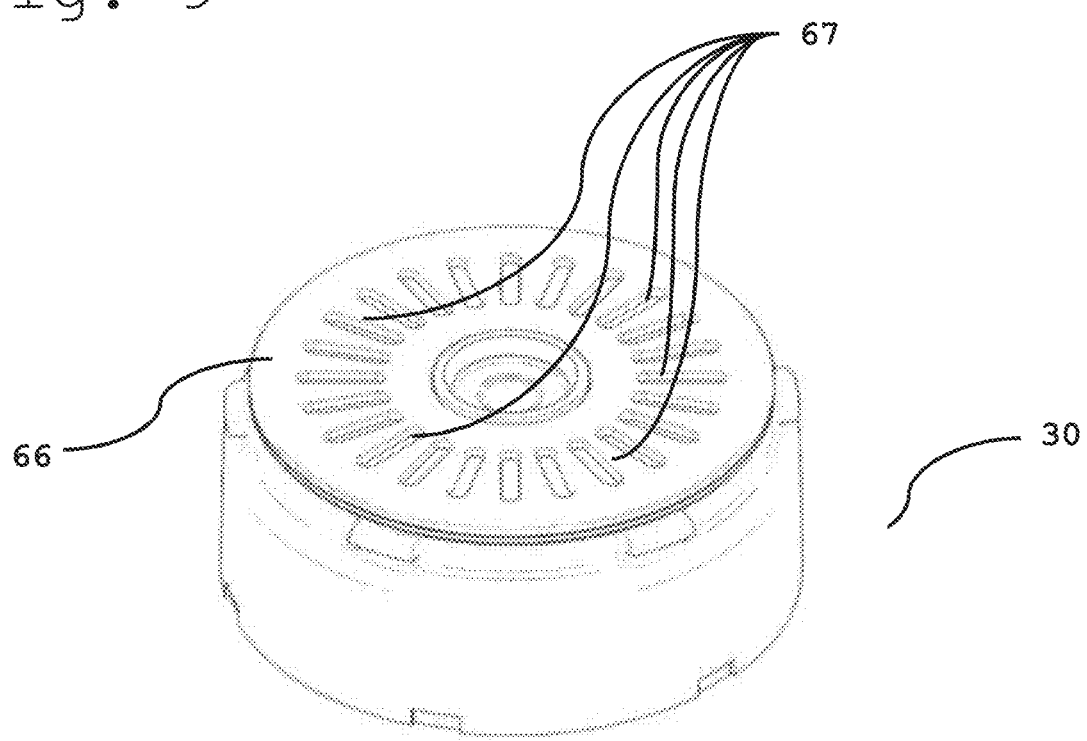
FIG. 9 is a perspective view of a further embodiment of the closure element of the present invention.

According to another alternative embodiment (see FIG. 9), the anti-rotation means comprises a disk 66 arranged on the surface of the first portion 51 of the substrate 50 facing the top wall 21 of the outer cap member 20. For example, the disk 66 may be attached to the cited surface by means of an adhesive layer.

The disk 66 presents a plurality of radial recesses 67 evenly distributed along a circumferential direction. The recesses 67 fit with corresponding ribs (not shown) protruding from the top wall 21 of the outer cap member 20.

The anti-rotation means may also comprise a further disk (not shown) arranged between the second portion 52 of the substrate 50 and the top wall 31 of the inner cap member 30.

While specific embodiments have been discussed, various modifications may of course be made, and the invention is not limited to the specific form or configuration of parts described herein, except insofar as such limitations are included in the following claims. It will be understood by the skilled person that sub-combinations are of utility and may be employed even without explicit reference to other features.

REFERENCE SIGNS

10 Closure element
20 Outer cap member
21 Top wall (of the outer cap member 20)
22 Side wall (of the outer cap member 20)
23 Teeth
30 Inner cap member
31 Top wall (of the inner cap member 30)
32 Side wall (of the inner cap member 30)
33 Grooves
34 Screw portion
40 Transponder (RFID tag)
41 Chip
42 Antenna
43 Control loop
43a Portion (of the control loop 43)
50 Substrate
51 First portion
52 Second portion
53 Hinge portion
61 Ribs
61a First ribs
61b Second ribs
62 Centring feature
63 Further centring feature
64 Centring hole
65 Further centring hole
66 Disk
67 Recesses
70 Coupling means
71 First hole
72 Second hole
73 Collar
100 Container

The invention claimed is:

1. Closure element (10) for closing a container (100), comprising:
an inner cap member (30) to be coupled with a mouth of the container (100); wherein the inner cap member (30) has a top wall (31) and a side wall (32) extending from an edge of the top wall (31);
an outer cap member (20) rotatably coupled to the inner cap member (30); wherein the outer cap member (20) has a top wall (21) and a side wall (22) extending from an edge of the top wall (21);
a transponder (40) housed between the inner cap member (30) and the outer cap member (20); the transponder (40) comprising a chip (41), an antenna (42) and a control loop (43);
characterised in that
the chip (41) is attached to one of the top wall (31) of the inner cap member (30) and the top wall (21) of the outer cap member (20) and at least a portion (43a) of the control loop (43) is attached to the other of the top wall (31) of the inner cap member (30) and the top wall (21) of the outer cap member (20), in such a way that a relative rotation of the outer cap member (20) and the inner cap member (30) determines a torsion or shear force to act on the control loop (43) to break it.

2. Closure element (10) according to claim 1, further comprising a substrate (50) on which the transponder (40) is housed; the substrate (50) comprising a first portion (51) housing the chip (41) and the antenna (42) and a second portion (52) housing said portion (43a) of the control loop (43); the first portion (51) being folded onto the second portion (52).

3. Closure element (10) according to claim 2, wherein the first portion (51) of the substrate (50) is attached to one of the top wall (31) of the inner cap member (30) and the top wall (21) of the outer cap member (20) and the second portion (52) of the substrate (50) is attached to the other of the top wall (31) of the inner cap member (30) and the top wall (21) of the outer cap member (20).

4. Closure element (10) according to claim 3, wherein the first portion (51) of the substrate (50) is attached to the top wall (21) of the outer cap member (20) and the second portion (52) of the substrate (50) is attached to the top wall (31) of the inner cap member (30).

5. Closure element (10) according to claim 2, wherein the first portion (51) of the substrate (50) and the second portion (52) are joined by means of a hinge portion (53); the control loop (43) passing across the hinge portion (53).

6. Closure element (10) according to claim 2, further comprising an anti-rotation means arranged between the substrate (50) and the top wall (21) of the outer cap member (20) and the top wall (31) of the inner cap member (30).

7. Closure element (10) according to claim 6, wherein the anti-rotation means comprises ribs (61, 61a, 61b) protruding from the first portion (51) and/or the second portion (52) of the substrate (50) and housed in corresponding recesses on the top wall (21) of the outer cap member (20) and/or on the top wall (31) of the inner cap member (30), respectively.

8. Closure element (10) according to claim 6, wherein the anti-rotation means comprises a plurality of first ribs (61a) protruding from the first portion (51) of the substrate (50) and housed in corresponding first recesses in the outer cap member (20) and a plurality of second ribs (61b) protruding from the second portion (52) of the substrate (50) and housed in corresponding second recesses in the inner cap member (30).

9. Closure element (10) according to claim 8, wherein the first ribs (61a) and the second ribs (61b) are straight ribs radially disposed around a centre of the first portion (51) and second portion (52) of the substrate (50).

10. Closure element (10) according to claim 6, wherein the anti-rotation means (60) comprises centring features (62, 63) projecting from the top wall (21) of the outer cap member (20) and the top wall (31) of the inner cap member (30), respectively;
wherein the first portion (51) and the second portion (52) of the substrate (50) present corresponding centring holes (64, 65) counter-shaped with reference to the centring features (62, 63); the holes (64, 65) being shaped such that they comprise at least a non-circular portion.

11. Closure element (10) according to claim 2, further comprising a coupling means (70) between the first portion (51) and the second portion (52) of the substrate (50) to maintain the relative position of the first portion (51) and the second portion (52) in a folded configuration.

12. Closure element (10) according to claim 11, wherein the coupling means (70) comprises a first hole (71) provided on the first portion (51) of the substrate (50), a second hole (72) provided on the second portion (52) of the substrate (50) and a collar (73) protruding from the second hole (72), the collar (73) being fitted around the first hole (71) in the first portion (51) of the substrate (50) in the folded configuration.

13. Closure element (10) according to claim 1, wherein the inner cap member (30) has a groove (33) arranged between the top wall (31) and the side wall (32) of the inner cap member (30), the groove facing the outer cap member (20); the outer cap member (20) comprising a tooth (23) arranged between the top wall (21) and the side wall (22) of the outer cap member (20); the tooth(23) being slidingly housed in the groove (33); wherein the groove (33) extends only in part along the circumferential extension of the inner cap member (30).

14. Closure element (10) according to claim 1, wherein the transponder (40) is a radio frequency identification tag; preferably the transponder (40) being a near field communication tag.

* * * * *